United States Patent [19]
Killian

[11] Patent Number: 5,269,357
[45] Date of Patent: Dec. 14, 1993

[54] REDUCED NOISE GENERATING TREAD PATTERN FOR A TIRE

[75] Inventor: Laurie W. Killian, Louisville, Ky.

[73] Assignee: Uniroyal Goodrich Tire Company, Akron, Ohio

[21] Appl. No.: 727,197

[22] Filed: Jul. 9, 1991

[51] Int. Cl.$^5$ ............................................. B60C 11/11
[52] U.S. Cl. ................................................. 152/209 R
[58] Field of Search ........ 152/209 R, 209 D, DIG. 3; D12/146, 147

[56] References Cited

U.S. PATENT DOCUMENTS

| | | | |
|---|---|---|---|
| D. 311,163 | 10/1990 | Rabinovich | D12/147 |
| D. 312,230 | 11/1990 | Wallet et al. | D12/147 |
| D. 316,388 | 4/1991 | Wallet et al. | D12/147 |
| 3,989,780 | 11/1976 | Vorih . | |
| 4,356,985 | 11/1982 | Yeager et al. . | |
| 4,474,223 | 10/1984 | Landers . | |
| 4,962,801 | 10/1990 | Tsuda | 152/209 R |

FOREIGN PATENT DOCUMENTS

| | | | |
|---|---|---|---|
| 0045203 | 2/1990 | Japan | 152/209 R |
| 3153405 | 7/1991 | Japan | 152/209 D |

OTHER PUBLICATIONS

1991 Tread Design Guide, p. 34-B. F. Goodrich Comp T/A HR4.

*Primary Examiner*—Michael W. Ball
*Assistant Examiner*—Nancy T. Krawczyk
*Attorney, Agent, or Firm*—Alan A. Csontos

[57] ABSTRACT

A tire having a mid-circumferential plane and comprising a plurality of circumferentially arranged tread blocks for contacting a road surface. Surfaces define a pair of substantially parallel grooves extending transverse to the mid-circumferential plane of the tire for at least partially defining each of the tread blocks. A channel separates each respective one of the plurality of tread blocks into a pair of tread elements. A first channel in a first tread block is oriented at a first angle relative to the mid-circumferential plane of the tire. The first angle varies from second and third angles at which second and third channels in respective second and third tread blocks adjacent the first tread block are oriented relative to the mid-circumferential plane of the tire.

17 Claims, 7 Drawing Sheets

REDUCED NOISE GENERATING TREAD PATTERN FOR A TIRE

BACKGROUND OF THE INVENTION

1. Technical Field

The present invention relates generally to a vehicle tire. In particular, the present invention relates to a tread pattern for the tire. The tread pattern generates a comparatively reduced level of noise during rotation of the tire on a road surface.

2. Description of the Prior Art

When a vehicle tire rotates on a road surface during operation, it is known that noise is generated. This is referred to as "tire/road noise" but will simply be referred to herein as "noise". The noise can be objectionable to an occupant inside of the vehicle or to a person located outside near the vehicle. The noise is generally attributed to the leading edge of each individual tread element of the tire impacting the road surface during rotation of the tire. Each impact disturbs the air surrounding the tread element and the tire. The additive effect of these repeated air disturbances is sound energy which has amplitude and frequency characteristics.

Reducing such noise has become important with the advent of the increasingly popular "all season" tire and with the introduction of legislation which limits noise emanating from operating vehicle tires. The all season tire has a plurality of tread elements arranged circumferentially in a spaced relationship about the tire and extending radially therefrom. The tread elements have a pitch length which is taken in the circumferential direction about the tire. Tire designers have attempted to reduce the amplitude of the sound energy or to spread the sound energy over a relatively wide spectrum of audible frequencies to approach what is commonly referred to as "white noise" which is relatively innocuous or less objectionable.

Tire designers have varied the pitch length ratio and/or the circumferential sequencing of adjacent tread elements. For example, U.S. Pat. No. 3,989,780 discloses a tire tread pattern with varied pitch length ratios between adjacent tread elements. Relatively high pitch length ratios can often lead to malwear of the tread elements. U.S. Pat. No. 4,474,223 discloses modifying the generation of noise in a rotating tire by sequencing a number of repeating design cycles. The sequencing is done according to a predetermined mathematical formula. However, further reduction in noise generated by a tire rotating on a road surface is continually being sought by tire manufacturers.

SUMMARY OF THE INVENTION

The present invention is directed to a vehicle tire having a tread designed to reduce the level of objectionable noise generated by the tire during rotation on a road surface. The tire according to a preferred embodiment of the present invention has a mid-circumferential plane. A plurality of circumferentially arranged tread blocks for contacting a road surface are located in a circumferential array about the tire. Surfaces define a pair of substantially parallel grooves which extend transversely to the mid-circumferential plane of the tire and at least partially define each of the tread blocks. A first channel separates a first one of plurality of tread blocks into a pair of tread elements. The first channel is oriented at a first angle relative to the mid-circumferential plane of the tire. A second channel separates a second one of the plurality of tread blocks located circumferentially adjacent the first tread block into a pair of tread elements. The second channel is oriented at a second angle relative to the mid-circumferential plane of the tire and the second angle varies from the first angle.

The tire further includes a third channel separating a third one of the plurality of tread blocks located circumferentially adjacent at least one of the first and second tread blocks into a pair of tread elements. The third channel is oriented at a third angle relative to the mid-circumferential plane of the tire. The third angle varies from the first and second angles. Preferably, each of the channels comprises a substantially straight groove. The surface means defining the transverse extending grooves comprises a portion adjacent the tread block which is substantially straight. The first angle varies from each of the second and third angles by at least 10°. The plurality of tread blocks may comprise a repeating sequence of tread blocks having channels with at least four different respective angles. The first angle at which the first channel is oriented at differs from the angle at which the transverse extending grooves adjacent the first tread block is oriented at relative to the mid-circumferential plane of the tire. Each of the channels has a depth taken in a direction radially of the tire and which depth is less than the depth of the transverse extending grooves.

Alternate embodiments of the present invention comprise a tire having a mid-circumferential plane and being rotatable about a longitudinal central axis. The tire includes a plurality of members for road engagement and which are arranged in a substantially circumferential array and project radially relative to the longitudinal central axis. First surface means defines a circumferential boundary of a first one of the plurality of members at a leading edge of the first member taken in a direction of rotation of the tire. The first surface means extends at a first angle relative to the mid-circumferential plane of the tire. Second surface means defines a circumferential boundary of a second one of the plurality of members at a leading edge of the second member taken in a direction of rotation of the tire. The second member is circumferentially adjacent the first member. The second surface means extends at a second angle relative to the mid-circumferential plane of the tire. The second angle is different than the first angle. Third surface means defines a circumferential boundary of a third one of the plurality of members at a leading edge of the third member taken in the direction of rotation of the tire. The third member is circumferentially adjacent to at least one of the first and second members. The third surface means extends at a third angle relative to the mid-circumferential plane of the tire. The third angle is different than the first and second angles.

Another alternate embodiment of the present invention includes fourth surface means defining a circumferential boundary of a fourth one of the plurality of members at a leading edge of the fourth member taken in the direction of rotation of the tire. The fourth member is circumferentially adjacent to at least one of the first, second and third members. The fourth surface means extends at a fourth angle relative to the mid-circumferential plane of the tire. The fourth angle is different than the first, second and third angles.

The tire also includes surface means defining a circumferential boundary of each of the plurality of members at a trailing edge of each member taken in the direction of rotation of the tire. The surface means includes a trailing edge surface extending at an angle which is substantially parallel to the angle at which a leading edge of a circumferentially adjacent member extends.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
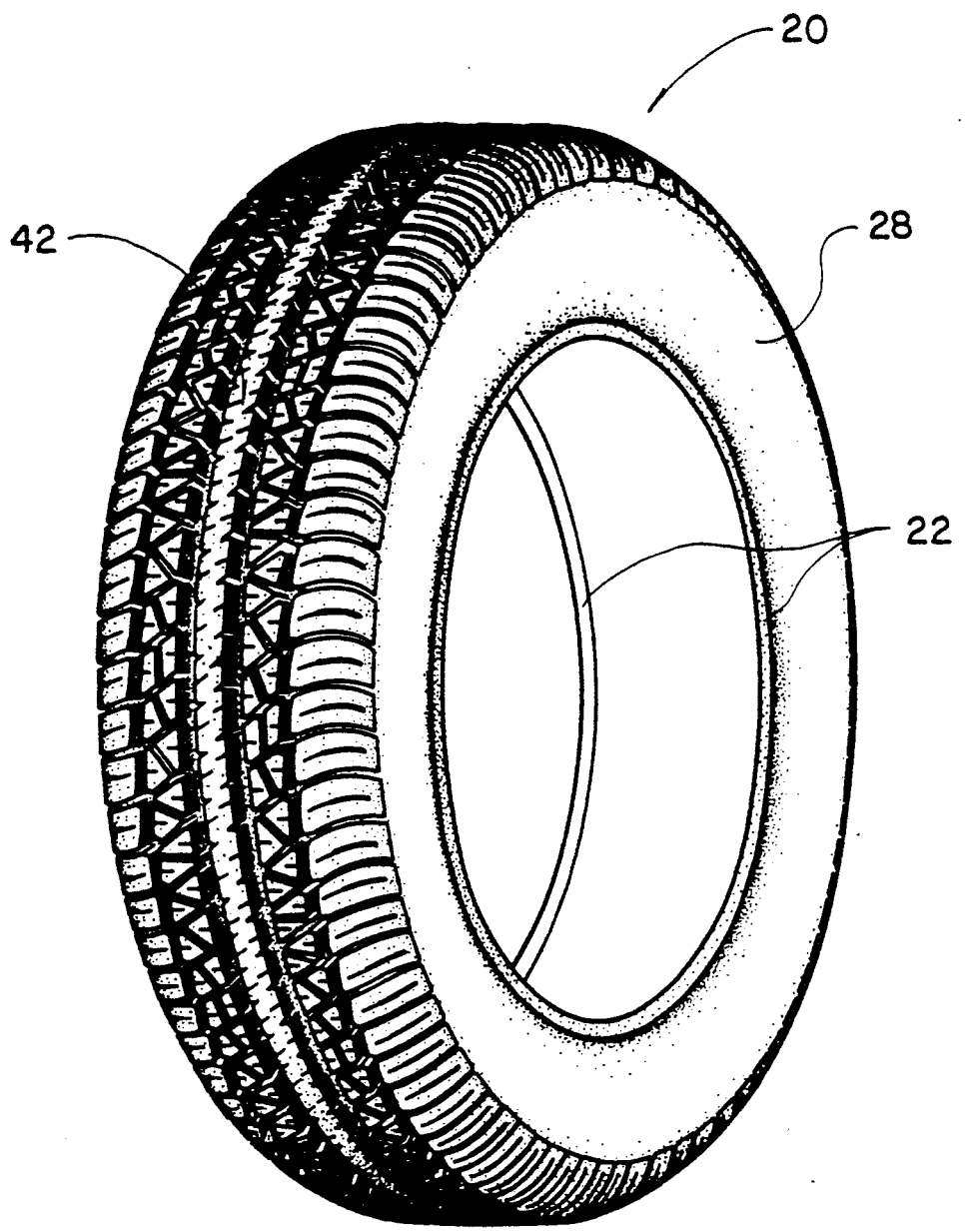
FIG. 1 is a perspective view of a tire having a tread pattern embodying the present invention.
Figure 2:
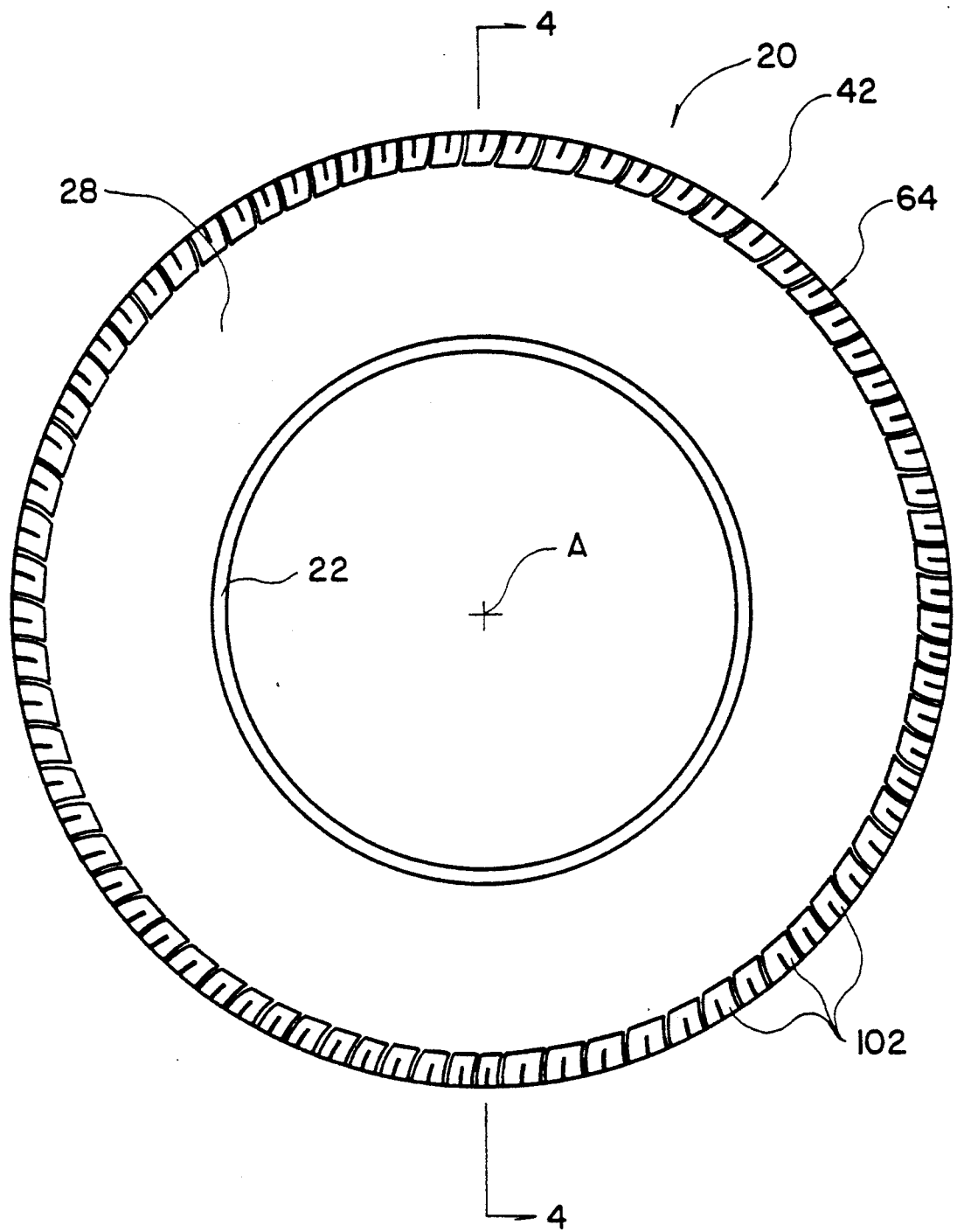
FIG. 2 is a side view of the tire illustrated in FIG. 1.

A tire 20 having features according to a preferred embodiment of the present invention is illustrated in FIG. 1. The tire 20 is suitable for use on a vehicle and, in particular, a passenger automobile. The tire 20 is rotatable about a longitudinal central axis A (FIGS. 2-4) during normal operation on a road surface.

The tire 20 includes a pair of axially spaced apart bead portions 22 (FIGS. 1, 3 and 4) which are substantially inextensible in a circumferential direction. An inner liner 24 (FIGS. 4 and 6), carcass 26 and rubber for sidewalls 28 and tread 42 are attached to and extend between the bead portions 22. The components extending between the bead portions 22 are formed into a generally toroidal shape and molded. The radially inward portion of the toroid is open for mounting on a vehicle wheel.

The tread 42 is located radially outwardly of the carcass 26 relative to the axis A. The tread 42 is intended primarily to engage a road surface and transfer load to the road. The tread 42 is formed from natural rubber, synthetic rubber or a suitable combination of the natural and synthetic rubbers.

The tread 42 of the tire 20 includes a specific pattern which embodies the preferred embodiment of the present invention. The pattern of the tread 42 is particularly suitable for use as an "all season" type of tire. In the preferred embodiment, illustrated in FIGS. 1, 3 and 5, the tread 42 includes five circumferentially extending ribs 62,64,66,82,84.

Figure 5:
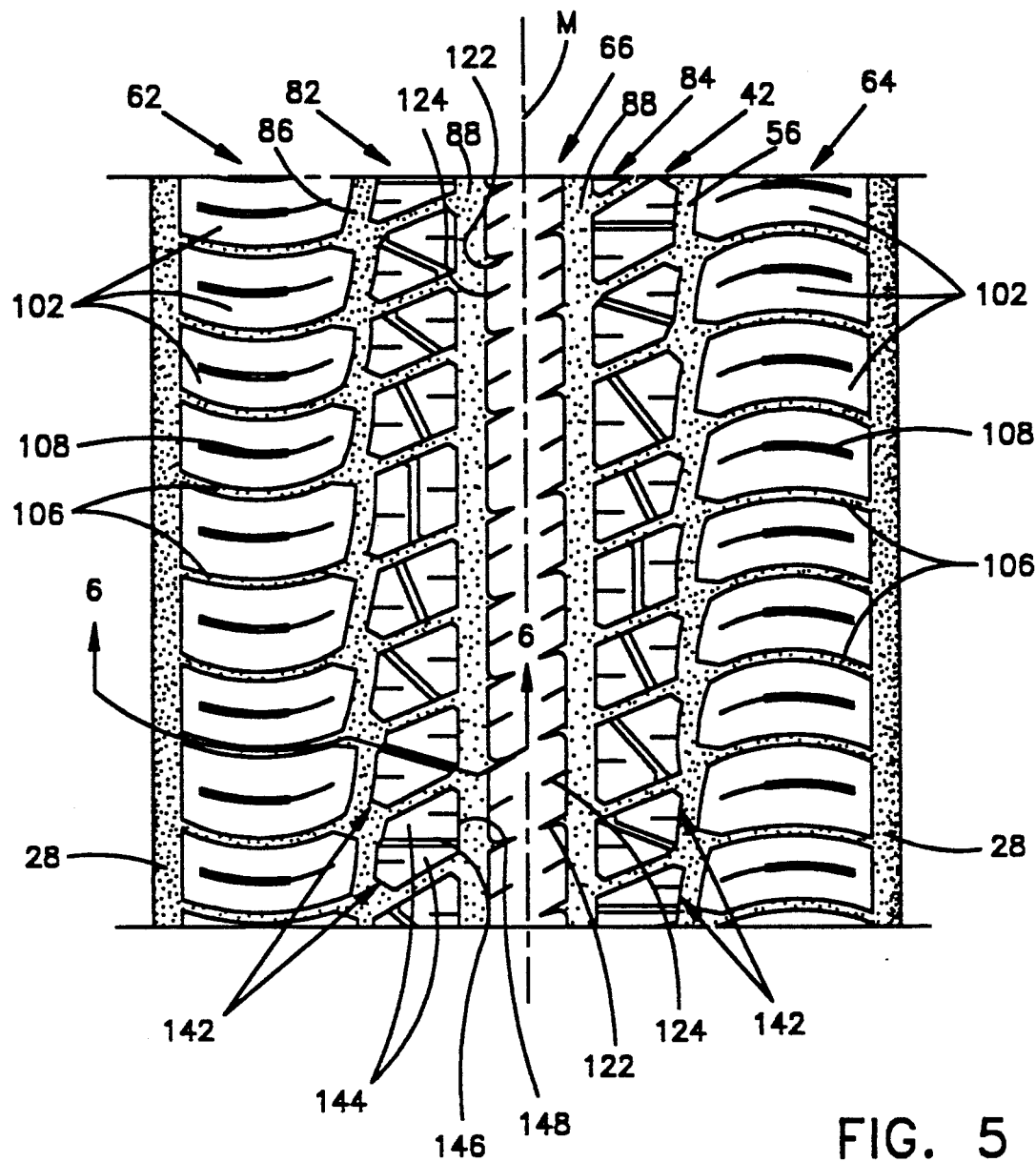
FIG. 5 is an enlarged plan view of a portion of the tread of the tire illustrated in FIG. 3.

Each of the axially outermost ribs 62,64 includes a plurality of circumferentially spaced shoulder tread blocks 102 (FIG. 5). The shoulder tread blocks 102 have a road engaging portion and a portion which extends axially from the road engaging portion and into the sidewall 28 (FIG. 6) of the tire 20. Each of the shoulder tread blocks 102 is separated from a circumferentially adjacent shoulder tread block by a transversely extending groove 106 (FIG. 5). Each of the grooves 106 define the circumferential boundary or limit of each of the tread blocks 102 in the shoulder ribs 62,64. The groove 106 may be straight as it extends transversely toward the mid-circumferential plane M of the tire 20 or may be curvilinear, as illustrated in the preferred embodiment.

Each of the shoulder tread blocks 102 includes a transversely extending notch 108. Only one notch 108 is illustrated in each shoulder tread block 102. However, it will be apparent that any number of notches 108 or additional sipes may be included in each shoulder tread block 102. It will also be apparent that the notch 108 may be of any configuration and extend in any direction.

The central rib 66, as illustrated in the preferred embodiment, is a continuous circumferentially extending tread element. The central rib 66 is bisected by the mid-circumferential plane M of the tire 20. The central rib 66 has a plurality of transversely extending notches 122 and a plurality of transversely extending sipes 124. The notches 122 are located along the central rib 66 at a continuation of the transverse groove 106. It will be apparent that a non-continuous central rib may be equally well adapted for use on the tire 20.

The tread 42 of the tire 20 also includes a pair of intermediate ribs 82,84 (FIG. 5). The intermediate ribs 82,84 are substantially identical and repeated at axially spaced locations on opposite sides of the mid-circumferential plane M. The intermediate ribs 82,84 are circumferentially offset relative to one another. Only the left intermediate rib 82 will be described in detail below and will equally describe the right intermediate rib 84.

Figure 3:
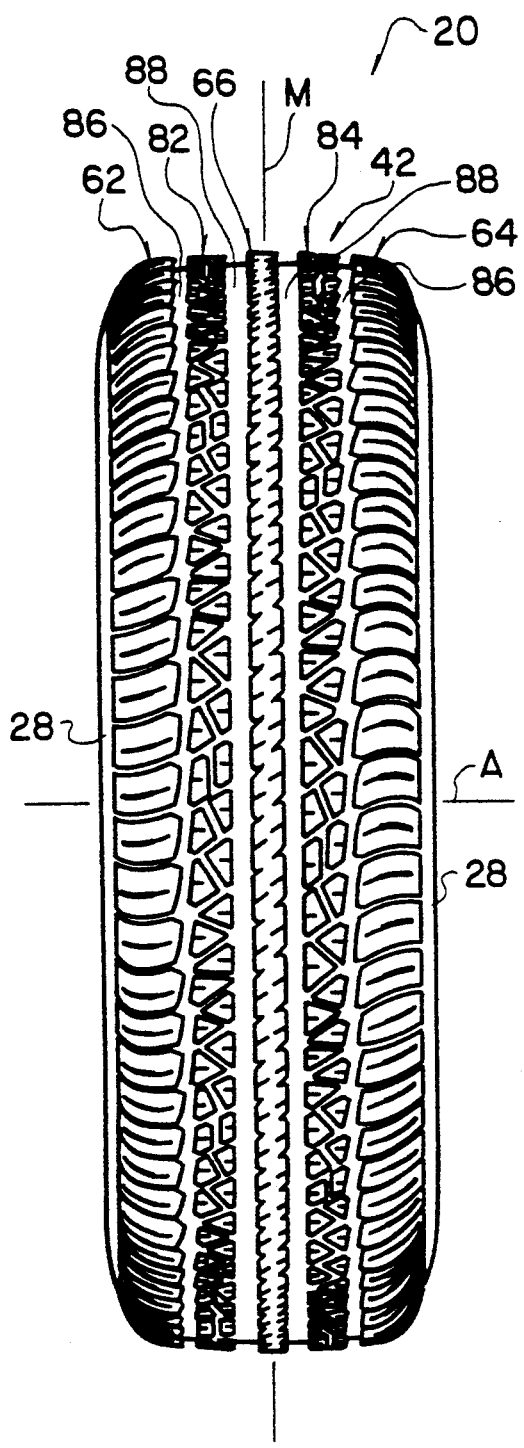
FIG. 3 is a front view of the tire illustrated in FIG. 1.
Figure 4:
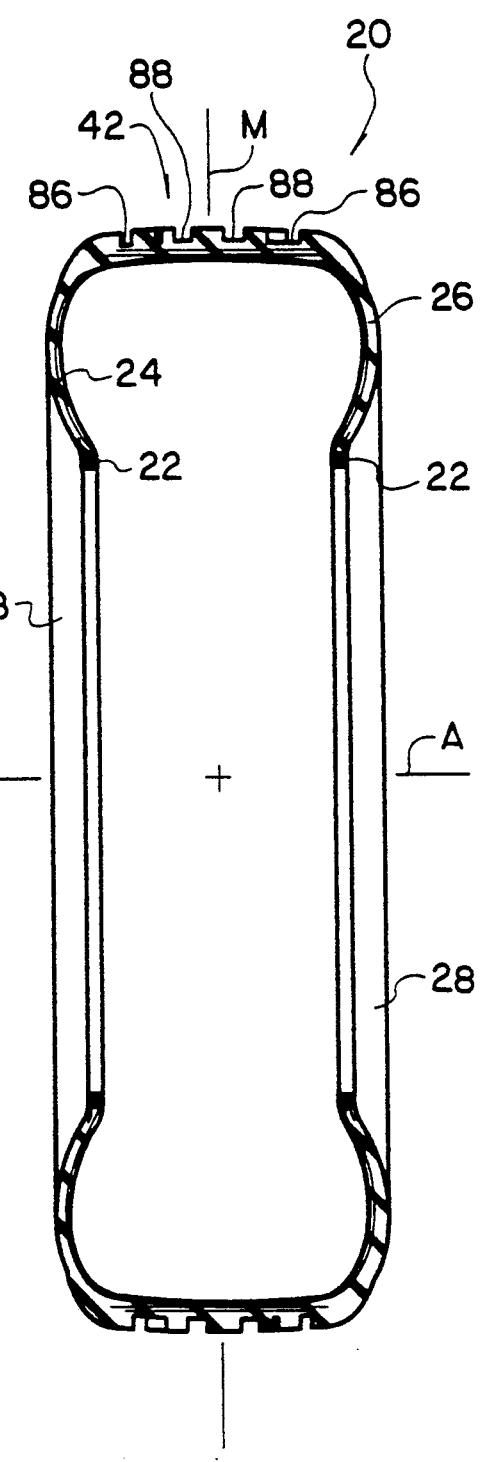
FIG. 4 is a cross-sectional view of the tire illustrated in FIG. 2, taken approximately along line 4—4 in FIG. 2.
Figure 6:
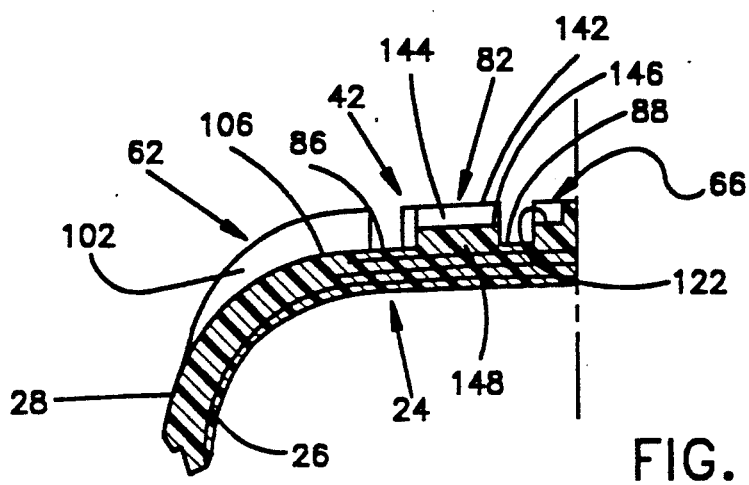
FIG. 6 is an enlarged cross-sectional view of the tire taken approximately along the line 6—6 in FIG. 5.

Each rib 82,84 is defined by grooves 86,88. The grooves 86,88 are substantially continuous in the circumferential direction. Each rib 82,84, thus, is located along the outer periphery of the tire within an axial distance defined by the grooves 86,88. Each groove 86,88 provides a "see through" portion of the tread 42, when viewed from straight on as illustrated in FIGS. 3, 4 and 6. This see through portion offers a continuous circumferential void for water, snow, mud, dirt or debris to enter during operation of the tire 20.

The left intermediate rib 82 includes a plurality of circumferentially arranged tread blocks 142. Each of the tread blocks 142 is partially defined in the circumferential direction by a continuation of the transverse grooves 106. The portion of the grooves 106 which define the circumferential limit or boundary of each tread block 142 in the intermediate rib 82 is preferably straight along the axial extent of the intermediate rib. It should be apparent that the portion of the grooves 106 defining the tread blocks 142 does not have to be a continuation of the grooves defining the shoulder tread blocks 102.

Each tread block 142 includes surfaces defining a channel 146 (FIGS. 5 and 6). The channel 146 separates the tread block 142 into a pair of tread elements 144. The channel 146 is preferably straight. The channel 146 has a depth (see FIG. 6), taken in a direction radially of the axis A of the tire 20, which is less than the depth of the groove 106. The depth of the channel 146 is preferably less than one-half of the depth of the groove 106. The portion of the tire 20 located radially inwardly of the channel 146 is often referred to as a "tie block" 148. The tie block 148 functions to connect pairs of tread elements 144 and provide increased tread strength. The tie blocks 148 reduce movement of the connected tread elements 144 in the circumferential and transverse directions of the tire 20 during rotation of the tire through a contact patch. A contact patch is that portion of the tire 20 in engagement with the road surface.

It will be apparent that in the left intermediate rib 82, as illustrated in FIG. 5, that each channel 146 is oriented at an angle relative to the mid-circumferential plane M differently than the angle of the channel in a circumferentially adjacent tread block 142. Each channel 146 differs in angular orientation from a circumferentially adjacent channel by at least 10°. It will be apparent that at least two repeating orientation sequences of channels 142 are required. In the preferred embodiment, it will be apparent that there are eight repeating pitch sequences of tread blocks 142 in the intermediate ribs 82,84. The pitch length of each tread block 142 could be varied in different pitch ratios around the circumference of the tire 20. The sequencing of tread blocks 142 around the circumference of the tire 20 may also be varied.

Varying the angle of the channels 146 in adjacent tread blocks 142 is referred to as a "rotating laterals" or "rotating channels" concept. It is precisely this variation of the angle in adjacent channels 146 in circumferentially adjacent tread blocks 142 that permit a reduction in the level of noise generated by the tire 20 embodying the present invention. Noise generated by a tire rotating on a road surface results from the additive effect of the tread elements repeatedly impacting the road surface and disturbing the air surrounding the tread elements 144. By varying the angle at which the channel 146 of a tread block 142 is oriented, the sound energy generated by any individual tread block 142 is not identical to the sound energy generated by circumferentially adjacent tread blocks. Thus, the sound energies generated by all of the tread blocks 142 do not reinforce fundamental frequency bands or ranges in the audible sound spectrum. This does not allow the concentration at any one frequency to rise to an objectionable noise level as perceived by a human ear. It will be further obvious that by also varying the pitch lengths and/or sequencing, further interference or non-concentration at any one frequency is possible.

Another feature of the rotating lateral concept is the variable widths of the channels 146. Preferably, a transversely extending channel 146 is narrower than a circumferentially extending channel, as viewed in FIG. 5. As the angle at which each channel 146 extends changes from transverse to circumferential the width of that channel increases gradually from the width of the transverse channel towards the width of the circumferential channel.

Figure 7:
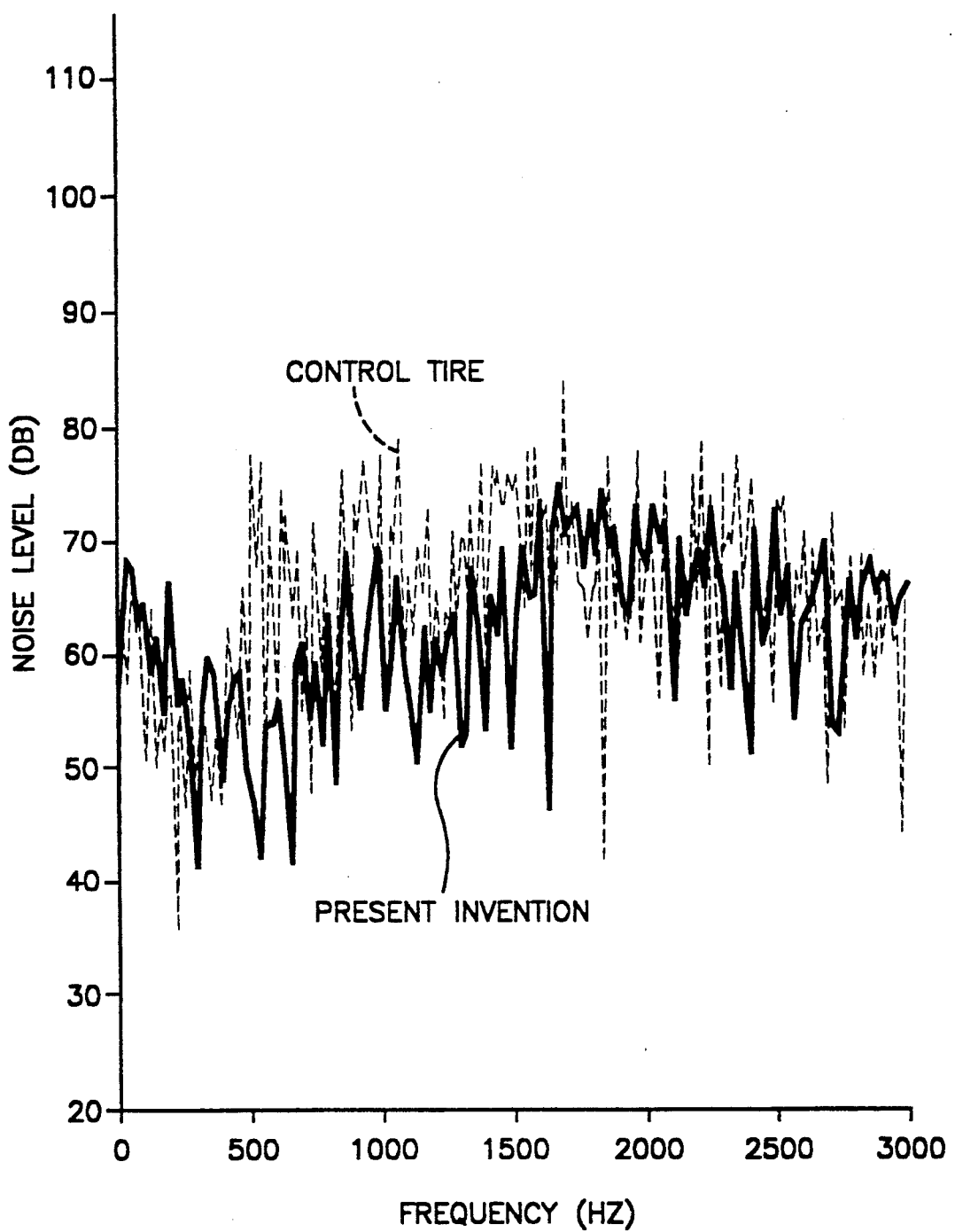
FIG. 7 is a graph of noise levels generated by a control tire and by the tire embodying the present invention.

As illustrated in FIG. 7, the noise generated by a tire 20 embodying the present invention was compared against that of a control tire. The graph of FIG. 7 illustrates the results of a noise analysis of tires having different tread patterns. The analysis was performed by computer simulation on the two tread patterns and is described in detail in U.S. Pat. No. 4,727,501. The results of the analysis are represented in FIG. 7 as amplitude over a selected range of audible frequencies.

The control tire was a BFGoodrich ® Comp T/A ® HR size P215/65R15. The tire 20 embodying the present invention was the same size. The simulated noise of the control tire is represented in FIG. 7 by a dashed line. The simulated noise of a tire 20 having a tread 42 according to the present invention is represented by a solid line in FIG. 7.

Differences between the simulated noise of the tire 20 embodying to the present invention and the simulated noise of the control tire becomes apparent in FIG. 7. The simulated noise of the tire 20 embodying the present invention was considerably lower in the frequency range of 500 to 1500 hertz. It is widely known in the tire industry that this frequency range is often the most audible to the human ear and, therefore, the most troublesome to tire designers. Thus, the tire 20 embodying the present invention is considerably less objectionable in the audible range of the human ear.

An actual noise analysis was also performed between the two tires on a vehicle running on a road wheel in an anechoic chamber. The vehicle used during the test was a 1989 Chevrolet Caprice four door sedan. A summary of objective results appears below.

| Tire | 35 mph | 45 mph | 55 mph |
| --- | --- | --- | --- |
| EXTERIOR NOISE (db) AT 0.5 METER OUTGO | | | |
| Present Invention | 92.1 | 98.2 | 100.1 |
| Control | 93.6 | 98.0 | 103.0 |
| INTERIOR VEHICLE NOISE (db) BROAD BAND 0-3200 Hz | | | |
| Present Invention | 77.9 | 83.3 | 76.0 |
| Control | 82.2 | 87.1 | 83.3 |
| INTERIOR VEHICLE NOISE (db) ZOOM BAND 128-1728 Hz | | | |
| Present Invention | 49.3 | 50.4 | 57.0 |
| Control | 54.1 | 55.0 | 56.0 |

The tire 20 according to the present invention yielded a reduced actual noise throughout most of the tests. The vehicle interior noise measurements which are band limited as indicated in the table by "zoom band" show that the tire 20 according to the present invention generates reduced noise relative to the control tire at lower speeds. The zoom band is believed to be the primary tire noise range of frequencies attributable to the tread only. The lower speeds are also thought to be more important to a tire designer because at higher speeds, tire noise tends to be masked by wind and vehicle noise.

Figure 8:
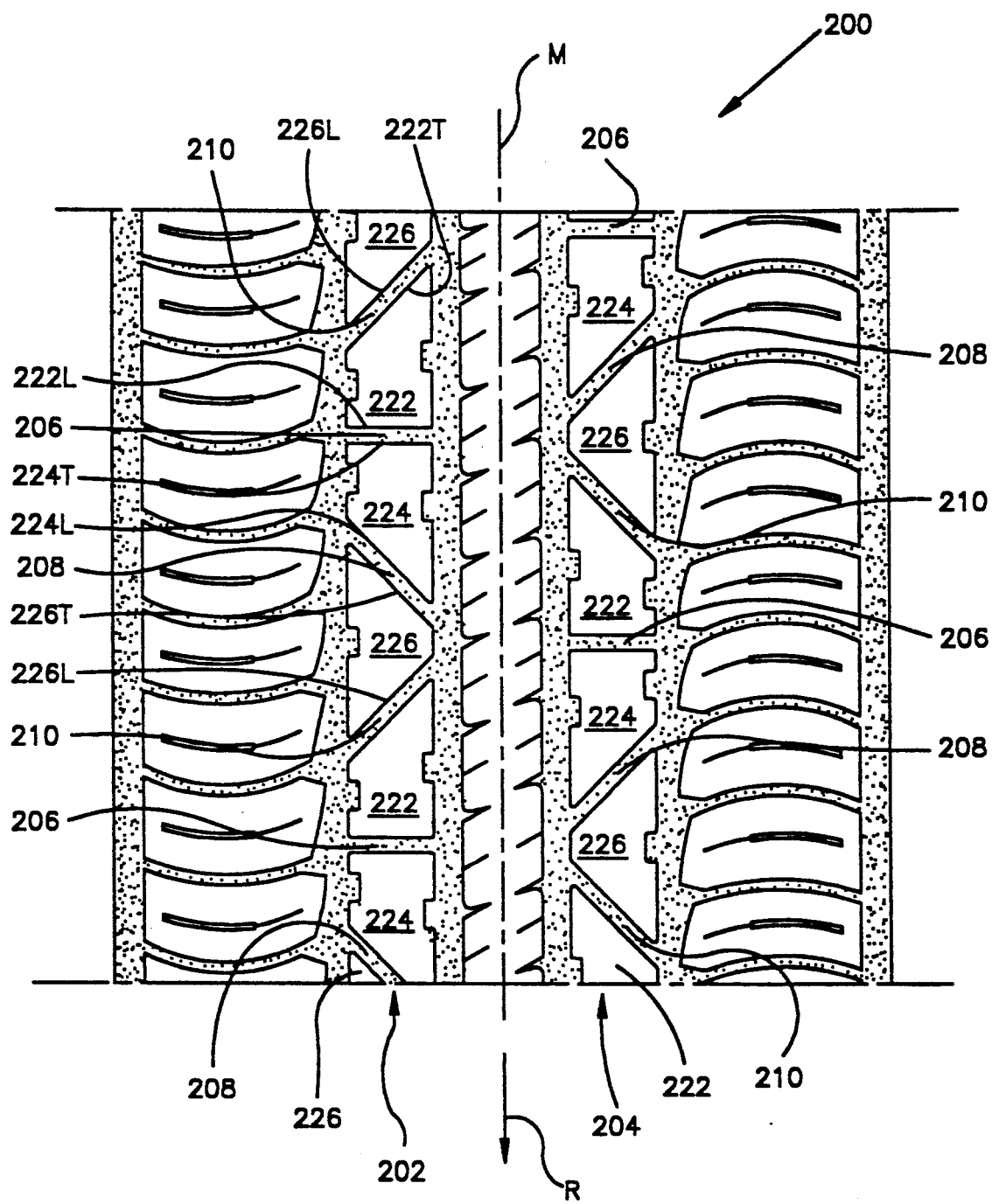
FIGS. 8 and 9 are views similar to FIG. 5, illustrating alternate embodiments of the invention.

An alternative embodiment of the present invention is illustrated in FIG. 8. A tread 200 has shoulder ribs and a continuous circumferential rib which are substantially identical to the tread 42 of the tire 20 illustrated in FIGS. 1, 3 and 5 and described above. However, the tread 200 includes intermediate ribs 202,204 which are different than the intermediate ribs 82,84 of the tread 42 and illustrated in FIGS. 1, 3 and 5. The intermediate ribs 202,204 embody another variation of the "rotating laterals" concept.

The left intermediate rib 202 is essentially a mirror image of the right intermediate rib 204 relative to the mid-circumferential plane M of the tire and is circumferentially offset therefrom. Thus, a detailed description of the left intermediate rib 202 will equally describe the right intermediate rib 204.

The left intermediate rib 202 includes a plurality of circumferentially arranged load carrying members or tread elements 222,224,226 for engaging a ground surface. The tread elements 222,224,226 appear in a repeating sequence around the outer circumference of the tire.

The tread element 222 is circumferentially separated from the tread element 224 by a transversely extending groove 206. The groove 206 includes surfaces, at least one of which defines a leading edge 222L or circumferential boundary of a tread element. For example, if the tire is rotating through a contact patch in a direction of tire rotation R as indicated by the arrow in FIG. 8, the tread element 222 has its leading edge 222L defined by the groove 206. The leading edge 222L is the first portion of the tread element 222 to engage the ground.

The tread element 224 has a trailing edge 224T defined by the same groove 206. Preferably, the surfaces 222L and 224T extend in a substantially parallel direction relative to the mid-circumferential plane M of the tire. In the embodiment illustrated in FIG. 8, the groove 206 is defined at least partially by the surfaces 222L and 224T extending in a direction substantially perpendicular to the mid-circumferential plane of the tire.

A groove 208 partially defines the circumferential boundary of the tread element 224 at a leading edge 224L. The groove 208 also defines a trailing edge 226T of the tread element 226 located circumferentially adjacent to the tread element 224. The groove 208 extends at an acute angle of 45° relative to the mid-circumferential plane M of the tire and in a direction upwardly to the left from the mid-circumferential plane, as viewed in FIG. 8.

Similarly, the groove 210 is defined by a leading edge 226L of the tread element 226 and a trailing edge 222T of the circumferentially adjacent tread element 222. The groove 210 extends at an acute angle of 45° relative to the mid-circumferential plane M of the tire and in a direction downwardly to the left relative to the mid-circumferential plane M, as viewed in FIG. 8.

The angles at which the grooves 206, 208 and 210 extend are different. As used herein, the word "angle" is intended to mean not only magnitude of orientation at which the groove extends relative to the mid-circumferential plane M but also the direction at which the groove extends relative to the mid-circumferential plane. Thus, it will be apparent that while the angular magnitude that the grooves 208 and 210 extend relative to the mid-circumferential plane M of the tire are the same, the directions that the grooves extend are in different directions. Thus, as defined herein, the angles are different. Therefore, the intermediate rib 202 of the tread pattern illustrated in FIG. 8, includes tread elements 222, 224, 226 which are separated by three rotating laterals or grooves 206, 208, 210 disposed at different angles relative to the mid-circumferential plane M.

Figure 9:
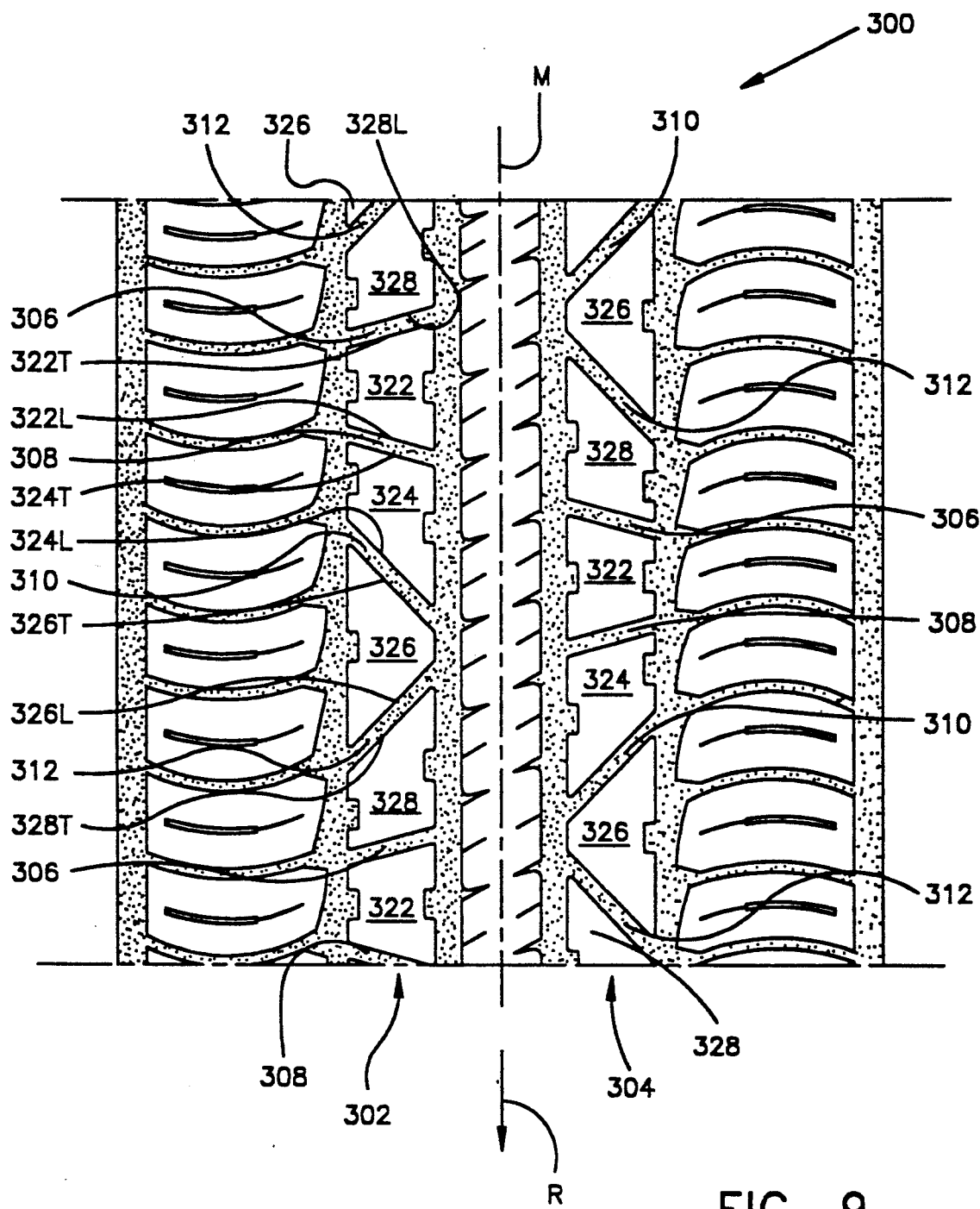

Yet another alternate embodiment of the present invention is illustrated in FIG. 9. A tread 300 has a pair of axially outermost shoulder ribs and a central continuously circumferential rib which are substantially identical to the tread 42 of the tire 20 illustrated in FIGS. 1, 3 and 5. The tread 300 includes intermediate ribs 302, 304. The intermediate ribs 302, 304 embody another variation of the "rotating laterals" concept.

Each of the intermediate ribs 302, 304 have a plurality of circumferentially arranged load carrying members or tread elements 322, 324, 326, 328 for engaging a road surface. The tread elements 322, 324, 326, 328 appear in a repeating sequence around the outer circumference of the tire. Circumferentially adjacent pairs of the tread elements 322, 324, 326, 328 are separated by respective grooves 306, 308, 310, 312.

The groove 306 is defined by a leading edge surface 328L of tread element 328 taken in a direction of tire rotation R of the tire through a footprint and by trailing edge surface 322T of tread element 322. The groove 306 extends at an acute angle of 75° relative to the mid-circumferential plane M of the tire and in a direction downwardly to the left, as viewed in FIG. 9.

Similarly, the groove 308 extends at an acute angle of 75° relative to the mid-circumferential plane M of the tire and in a direction upwardly to the left. The groove 310 extends at an acute angle of 45° relative to the mid-circumferential plane M of the tire and upwardly to the left. The groove 312 extends at an acute angle of 45° relative to the mid-circumferential plane M and downwardly to the left. Thus, the intermediate ribs 302, 304 have tread elements 322, 324, 326, 328 which are separated by at least four rotating laterals or grooves 306, 308, 310, 312 disposed at four distinctly different angles.

Again, when the word "angle" is used herein it means not only the angular magnitude of the groove relative to the mid-circumferential plane M of the tire but to the direction at which it extends. Thus, there are four rotating laterals or grooves 306, 308, 310, 312 in each intermediate rib 302, 304 of the tread 300. Each of angles of these four grooves 306, 308, 310, 312 are different.

The present invention is not intended to be limited to the embodiments illustrated. The embodiments illustrated are for example purposes of applying the "rotating lateral" concept of the present invention to specific rib configurations. Thus, it will be apparent that the present invention may be equally applicable to any rib or rib configuration as well as a tire with any number of ribs.

From the above description of preferred embodiments of the invention, those skilled in the art will perceive improvements, changes and modifications. Such improvements, changes and modifications within the skill of the art are intended to be covered by the appended claims.

Having described a preferred embodiment of the invention, what is claimed is:

1. A tire having a mid-circumferential plane, said tire comprising:

a plurality of circumferential arranged tread blocks for contacting a road surface;

each of said tread blocks at least partially defining a pair of substantially parallel grooves extending transverse to the mid-circumferential plane of the tire for at least partially defining each of said tread blocks;

a first channel circumferentially separating a first one of said plurality of tread blocks into a pair of tread elements, said first channel being oriented at a first angle relative to the mid-circumferential plane of the tire;

a second channel circumferentially separating a second one of said plurality of tread blocks located circumferentially adjacent said first tread block into a pair of tread elements, said second channel being oriented at a second angle relative to the mid-circumferential plane of the tire which varies from the first angle; and a third channel circumferentially separating a third one of said plurality to tread blocks located circumferentially adjacent at least one of said first and second tread blocks into a pair of tread elements, said third channel being oriented at a third angle relative to the mid-circumferential plane of the tire which varies from the first and second angles.

2. The tire set forth in claim 1 wherein said first angle varies from each of said second and third angles by at least 10 degrees.

3. The tire set forth in claim 1 wherein each of said channels is substantially straight.

4. The tire set forth in claim 1 wherein said plurality of tread blocks comprise a repeating sequence of tread blocks having channels with at least four different angles.

5. The tire set forth in claim 1 wherein each of said channels has a depth taken in a direction radially of the tire and which depth is less than the depth of said transverse extending grooves.

6. The tire set forth in claim 1 wherein said surface means defining said transverse extending grooves comprises a portion adjacent said tread block which is substantially straight.

7. The tire set forth in claim 1 wherein said first angle at which said first channel is oriented differs from the angle at which said transverse extending grooves adjacent said first tread block is oriented relative to the mid-circumferential plane of the tire.

8. A tread for a tire, said tread, when in a substantially annular configuration for mounting on a tire, comprising:

a pair of axially spaced apart shoulder ribs, each of said pair of shoulder ribs including a plurality of circumferentially arranged shoulder tread blocks for contacting a road surface;

each of said plurality of tread blocks at least partially defining a pair of substantially parallel grooves extending transverse to the mid-circumferential plane of the tire, each of the transverse grooves separating a pair of adjacent should tread blocks;

intermediate ribs located between said shoulder ribs, said intermediate ribs including a plurality of circumferentially arranged intermediate tread blocks, adjacent intermediate tread blocks being separated by a continuation of a respective transverse groove in at least one of said shoulder ribs; and each of said intermediate tread blocks having a channel dividing said tread block into a pair of tread elements, said channel oriented at an angle relative to the mid-circumferential plane of the tire different from the angles at which channels in adjacent intermediate tread blocks are oriented.

9. The tread set forth in claim 8 wherein said angle of the channel orientation is different from the angle at which the transverse groove adjacent the intermediate tread block is oriented at.

10. The tread set forth in claim 8 wherein said channel comprises a substantially straight groove.

11. The tread set forth in claim 8 wherein each of the transverse grooves comprise a substantially straight portion located adjacent said tread block.

12. The tread set forth in claim 8 wherein said plurality of tread blocks comprise a repeating sequence of tread blocks having at least four different angled channels.

13. The tread set forth in claim 8 wherein the angles of said channels in adjacent tread blocks differ by at least 10°.

14. The tread set forth in claim 8 wherein a pair of transverse grooves defining respective shoulder tread blocks in each of said shoulder ribs and an intermediate tread block contain a single plane extending across the tire tread.

15. The tread set forth in claim 8 further including a second intermediate rib located between said shoulder rib and axially spaced from said other intermediate rib, said second intermediate rib configured substantially identical to said other intermediate rib.

16. The tread set forth in claim 15 further including a continuous circumferential rib located between said second intermediate rib and said other intermediate rib.

17. The tread set forth in claim 8 wherein each of said channels has a depth taken in a radial direction and which depth is less than the depth of each of said transverse grooves.

* * * * *